April 28, 1959 — A. WALULIK ET AL — 2,884,133
FILTER CARTRIDGE
Filed Dec. 9, 1955 — 2 Sheets-Sheet 1

ALBERT WALULIK
JOHN R. WILHELM
INVENTORS

BY Reuben Wolk
ATTORNEY

April 28, 1959  A. WALULIK ET AL  2,884,133
FILTER CARTRIDGE

Filed Dec. 9, 1955  2 Sheets-Sheet 2

ALBERT WALULIK
JOHN R. WILHELM
INVENTORS

BY Reuben Wolk
ATTORNEY

United States Patent Office 2,884,133
Patented Apr. 28, 1959

2,884,133

FILTER CARTRIDGE

Albert Walulik, Cranford, and John R. Wilhelm, Perth Amboy, N.J., assignors to Purolator Products, Inc., Rahway, N.J., a corporation of Delaware Application December 9, 1955, Serial No. 552,057

4 Claims. (Cl. 210—136)

This invention relates to improvement in liquid filter cartridges, especially cartridges containing valve provisions.

Liquid filters for automotive use are often of the type in which a housing is permanently mounted on the engine and coupled to the oil inlet and outlet. Filter elements of the throw-away type are installed in the housing, which is periodically opened, the element removed and discarded, and a replacement installed.

While it is often economically feasible to use this type of filter, there may be reasons why it is preferable to provide filter cartridges instead. A filter cartridge combines a housing and element which are permanently assembled and merely need to be coupled to the oil inlet and outlet by attaching it directly to the engine. When the cartridge needs replacement the whole unit is removed and discarded and a new one installed in its place. Where the filter cartridge is installed directly on the engine the relationship of the two is such that when the engine is stopped, all the oil in the filter is at a higher level than the oil reservoir in the engine, thus permitting this oil to drain back into the reservoir. Such a condition causes the temporary starvation of the engine when it is first started up. This is not overcome until the engine is started again and oil is passed through the filter.

The principal object of this invention is the design of a filter cartridge that is easily installed and removed.

A further object of this invention is to provide a cartridge using a simple valve permitting inlet of the fluid.

A further object of the invention is to provide a cartridge that will prevent drainback of the liquid being filtered.

Still another object of the invention is to provide a cartridge using a simple sealing structure.

An additional object of the invention is the provision of a spring diaphragm to control the inlet valve.

Another object of the invention is to combine the inlet valve and the drainback mechanism in a single unit.

These and other objects are accomplished by providing a sealing disc and gasket backed by a diaphragm type spring in the lower portion of the cartridge. These parts are mounted on the inlet side of the cartridge and perform the dual function of acting as a one-way valve to permit entrance of the liquid to the cartridge and preventing draining of the liquid from the cartridge into the engine. At the same time the cartridge is so constructed that it provides a positive seal to the portion of the engine on which it is mounted. The diaphragm type spring has a novel construction providing the necessary resistance when the engine is at rest, while permitting flow during engine operation and being capable of immediate change from one position to the other.

These and other novel features of the invention are described in the specifications and claims which follow and are shown in the drawing in which:

Figure 3 is an exploded view of the parts of the cartridge illustrating their assembled relationship.

Figure 1:
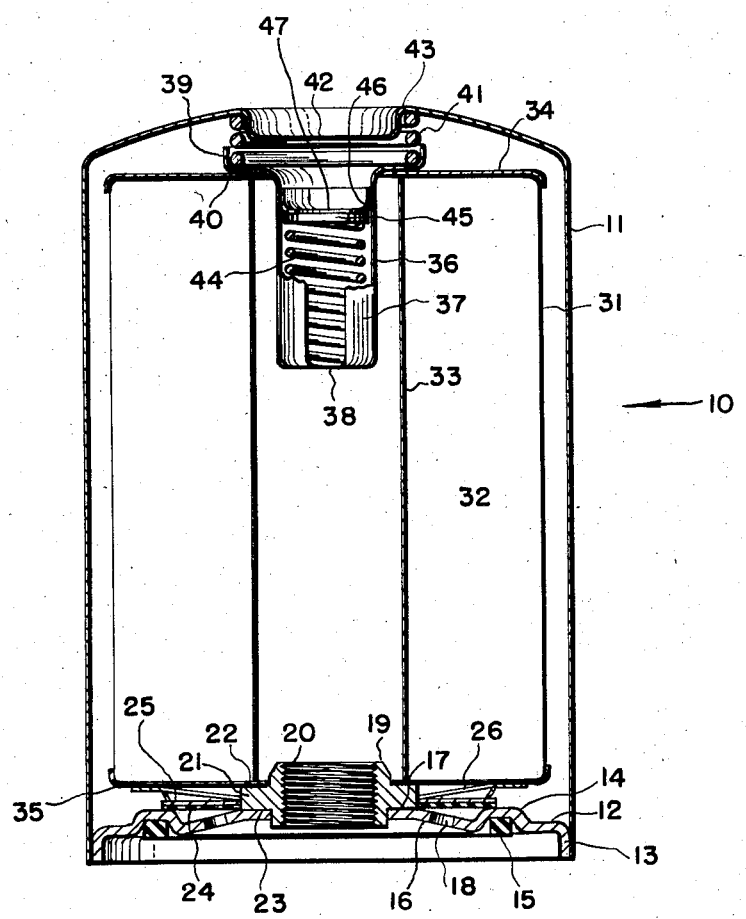
Figure 1 is a vertical view, partly in section, of a filter cartridge embodying the concepts of our invention.

As best shown in Figures 1 and 3 the removable cartridge 10 consists of a cylindrical housing 11 which is closed at the top and open at the bottom. A plate 12 which is approximately disc shaped forms the bottom of the housing. This plate includes downwardly turned flange 13 at the outer periphery which is fastened to the inner surface of the housing by welding, brazing or other conventional methods.

Figure 4:
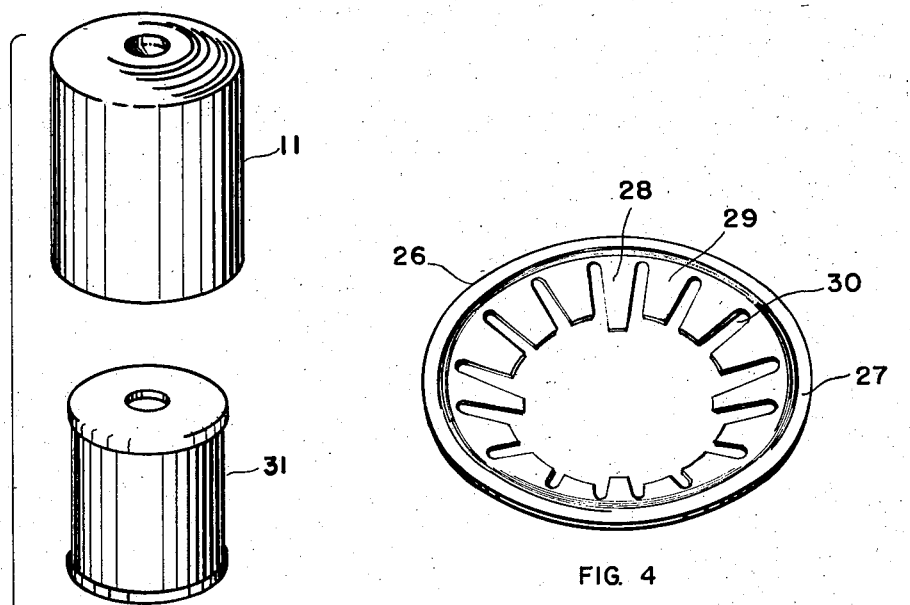
Figure 4 is an isometric view of the diaphragm spring.

The plate 12 has an offset portion 14 and a gasket 15 made of rubber or other conventional sealing material which is fastened to the under side of this offset portion by means of cement. The plate 12 has an upwardly angled portion 16 extending toward the inner periphery and terminating in the horizontal portion 17. A plurality of apertures 18 are located in the angled portion 16. In the center of the plate 12 is mounted a boss 19 consisting of a central threaded opening 20 and a shoulder 21 with an upper surface 22 and a lower surface 23. The lower surface 23 is fastened to the portion 17 of the plate by conventional means such as spotwelding. A gasket 24 made of rubber or other similar sealing material is loosely mounted concentrically about the boss 19, resting on the upper surface 14 such that a space is formed between the gasket and the apertures 18. A metal sealing disc 25 is placed directly on the gasket 24. The diaphragm spring 26, as more fully detailed in Figure 4, is essentially a disc made of spring steel, Phosphor bronze or other materials with the requisite resilience and consists of an outer horizontal portion 27 having fingers 28 and shorter prongs 29, separated by slots 30. The fingers and prongs in their normal state are at an angle with the portion 27. The purpose of this device will be later described.

Mounted within the housing 11 is a filter element 31 which may be of any conventional type. For illustrative purposes, however, the element shown is of the cylindrical convoluted paper type and consists of a pack 32 with a center tube 33 surmounted by upper and lower end caps 34 and 35. The lower end cap 35 rests partially on the upper surface 22 of the shoulder 21 of the boss 19, and also upon the portion 27 of the diaphragm spring 26. The shoulder 21, however, is the principal support and also serves to space the element away from the bottom plate 12. Mounted at the upper portion of the center tube 33 is a relief valve 36 consisting of a tube 37 which is open at the top and includes an aperture 38 at the bottom. The upper portion of the tube 37 is flared outwardly to form a cup 39, and the shoulder 40 of this cup rests on the upper end disc 34. It serves the dual function of sealing the upper portion of the tube and mounting the spring 41. The spring 41 serves to maintain the element in its proper relationship and is positioned by means of a depressed portion 42 of the top of the housing 11, with a shoulder 43 of this depressed portion providing a radial stop. A relief valve is provided by means of a spring 44 mounted within the cup 37 and surmounted by a disc 45 and the disc and spring are then maintained within the tube by means of a cover 46 containing an aperture 47. The cover 46 is assembled to the upper portion of the tube 37 by means of staking, riveting or other conventional means. The resultant assembly is a housing with a relief valve permanently built in a filter element and a valve assembly also permanently retained within the housing by means of a permanently fixed plate.

Figure 2:
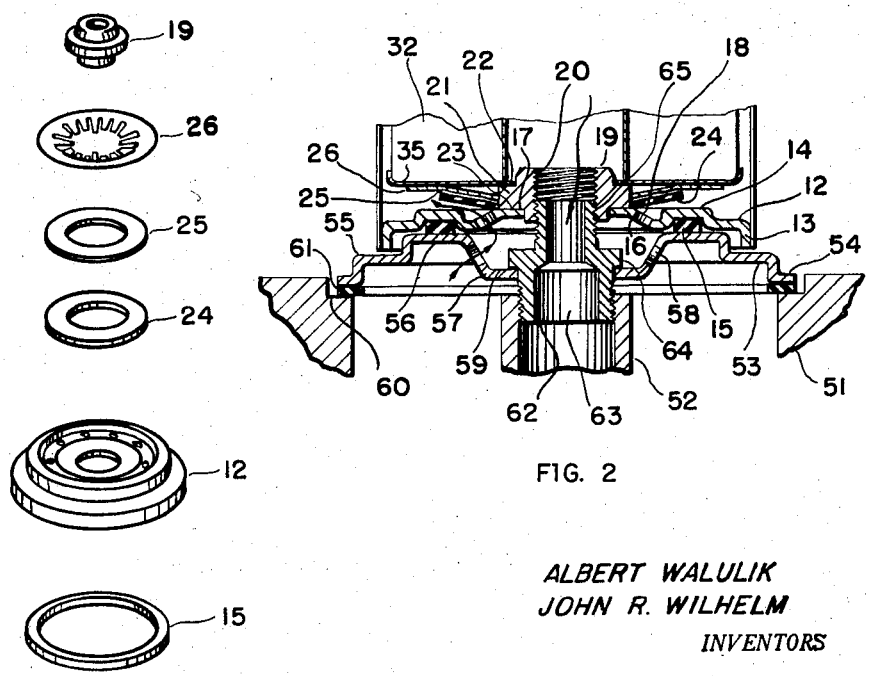
Figure 2 is a vertical sectional view of the lower portion of the device of Figure 1 and a portion of the engine on which the cartridge is mounted while the engine is operating.

Referring now to Figure 2 it can be seen that the cartridge can readily be installed on the engine block in a very simple manner. The engine includes a portion 51 specially designed for the installation of this cartridge and includes a central tube 52 which serves as the return from the filter to the engine. A special sealing plate 53 is also provided and includes an outer horizontal portion 54, another horizontal portion 55, which is offset inwardly, a third horizontal portion 56 which is offset still further inwardly, an angled portion 57 including a plurality of holes 58, and an innermost horizontal portion 59. This sealing plate is placed on the shoulder 60 of the engine block with a gasket 61 of conventional sealing material interposed between the shoulder and portion 54. A boss 62 including a center hole 63 is threaded into the central tube 52 and includes a shoulder 64 which retains the plate 53 tightly against the engine block by means of pressure against the innermost horizontal portion 59. The upper portion of the boss 62 is externally threaded at 65. The sealing plate 53, gasket 61, and the central boss are thus made a permanent part of the engine block. The holes 58 communicate with the outlet side of the oil pump (not shown), while the central tube 52 is in communication with the galleries of the engine.

Operation

The cartridge 10 is installed on the engine by placing the boss 19 of the cartridge over the boss 62 of the engine block and then turning it in order to engage the threads 20 and 65. This will result in the relationship shown in Figure 2 and as can be seen an accurate seal will result at several points. The mating threads provide the central seal and an additional seal is provided by the gasket 15 of the cartridge and the horizontal portion 56 of the engine sealing plate. Oil flows from the pump through the holes 58 of the sealing plate and through the apertures 18 of the cartridge. Under normal operating conditions the oil pressure will be sufficient to push against the gasket 24 and sealing disc 25 and overcome the resistance of the diaphragm spring 26. This lifts the gasket and plate off the offset portion 14 and permits flow into the annular spaces between the element 31 and the housing 11. The oil then passes through the pack 32 where the filtration process occurs, into the center tube 33 and through the bosses 19 and 62 and through the tube 52 and into the oil galleries. This operating position is illustrated in Figure 2.

The diaphragm spring 26 has been specially designed to give a prompt reaction to the pressure of the oil. The sealing disc 25 is forced against the fingers 28 and prongs 29 with the fingers 28 being forced inwardly until they make contact with the outer surface of the shoulder 21 of the boss 19. This locks the diaphragm spring radially, and the prongs 29 are further forced up until they reach their ultimate position. When the engine is not operating (as in Figure 1), the inherent spring qualities of the spring 26 will force the plate 25 and the gasket 24 down until contact is made with the offset portion 14 of the plate 12 and thus effectively block the apertures 18 to prevent the oil on the inlet side of the filter from draining back into the pump. This prevents starvation of lubricating system when the engine is started again.

The relief valve is of the conventional type and its function will be discussed only briefly. When the element 31 has become clogged with contaminants the pressure in the oil system will increase to such a point that it would be undesirable to permit the liquid to flow through the element. The spring 44 is designed with a lower pressure than that which is dangerous to engine operation and the liquid will seek a new path into the tube 37 and into the aperture 38 forcing the disc 45 downward against the spring 44. This creates a new passage and the oil merely flows directly through the center tube and out of the outlet. When the clogged filter condition has been reached it is desirable to replace the cartridge with a new one. This is accomplished merely by unscrewing the cartridge, that is, by breaking the threaded connections 20 and 65; the cartridge is then discarded and a new one inserted in its place.

Thus it can be seen that our invention contemplates a novel filter design in which only a simple procedure is required to replace a clogged filter unit, and the resulting design affords the additional protection of maintaining lubricating oil in the cartridge during the shutdown periods. These desirable results are accomplished by combining a housing and an element which are directly fastened to the engine block, and by providing a simple one-way valve in the cartridge inlet which permits flow of oil during operation but prevents return of oil when the engine is at rest.

It should be understood that modifications of the specific embodiment shown may occur to those skilled in the art without departing from the spirit of the invention. We do not intend to be limited to the details shown herein but what we claim is:

1. A replaceable filter cartridge comprising a housing and a filter element permanently contained therein, an end closure for said housing fastened to the latter and having inlet openings therein to admit fluid for filtration to said housing, a tubular mounting member secured to said end closure and providing a support for one end of the filter element within the housing as well as an outlet for filtered fluid, a gasket ring centered on said tubular mounting member and overlying the inlet openings, a disc overlying said gasket ring, a diaphragm member also centered on said tubular member and positioned between said end of said filter element and said disc, said diaphragm member having yieldable prongs serving to bias said disc and said gasket toward a sealing position on said end closure to seal the said inlet openings, said prongs being yieldable under pressure of fluid directed to said inlet openings to permit unsealing movement of the gasket relative to said inlet openings and admission of fluid under pressure to said housing for filtration, but said prongs acting to restore said gasket to its sealing position immediately on cessation of flow of fluid under pressure to the inlet openings to thus prevent drainage flow through the latter from said housing.

2. A replaceable filter cartridge comprising a housing and a filter element permanently mounted therein, an end closure for said housing, said end closure extending into said housing and being fastened thereto and having inlet openings therein, a boss having a threaded opening secured in another opening of said end closure and providing an outlet from said housing, a ring-like gasket mounted internally of said housing and about said boss and biasable into a sealing position on said end closure to seal off said inlet openings, a pronged diaphragm spring positioned on said boss between an end of the filter element and said gasket to bias the latter into said sealing position, the prongs of said spring being yieldable under pressure of fluid flowing to said cartridge to permit unsealing movement of said gasket relative to said inlet openings and to permit ingress of fluid under pressure to the housing via said inlet openings, but said prongs acting to restore said gasket to its said sealing position immediately upon cessation of flow of fluid under pressure to said inlet openings to prevent reverse drainage flow of fluid from said housing via said inlet openings upon said cessation of flow.

3. A replaceable engine oil filter cartridge comprising a housing having a filter element permanently located within the housing, an end plate extending into and closing one end of said housing, said end plate having a flange fastened to said housing and having a plurality of apertures concentrically located at spaced apart points of said plate to provide inlets to said cartridge, combination sealing and drain back preventing means located internally of said housing in relationship to said apertures to permit admission of oil under pressure to said housing via said apertures but prevent drain back flow of oil within said housing via said apertures, said last-named means including a gasket movable into a sealing position relative to said apertures, a disc overlying said gasket and a diaphragm spring for biasing said sealing disc and said gasket into a sealing position relative to said apertures, said diaphragm spring including yieldable prongs engageable directly with said disc and an annular portion engageable with an end of said filter element in said housing, whereby oil under pressure will be admitted to said housing by said apertures in opposition to the biasing action of said yieldable fingers and whereby the latter will bias said gasket to seal said apertures immediately upon cessation of flow of oil under pressure to said apertures thereby preventing drain back of oil within said housing via said apertures.

4. A replaceable filter cartridge comprising a cylindrical housing one of whose ends is permanently closed, a filter element permanently contained within said housing, an end closure for the other end of said housing, said end closure extending into said housing at said other end and being fastened to the inner surface of said housing adjacent said other end, said end closure having a centrally-disposed portion, a sloping portion and an offset portion, inlet openings in said sloping portion, a boss having a threaded opening secured in said centrally disposed portion, said threaded opening providing an outlet for said housing, a ring-like gasket mounted internally of said housing and around said boss and being biasable into a sealing position against said offset portion of said end closure to seal off said inlet openings, a pronged diaphragm spring positioned on said boss between an end of said filter element and said gasket to bias the latter into said sealing position, the prongs of said spring being yieldable under pressure of fluid flowing to said cartridge to permit unsealing movement of said gasket relative to said inlet openings and to permit ingress of fluid under pressure to the housing via said inlet openings, but said prongs acting to restore said gasket to its said sealed position immediately upon cessation of flow of fluid under pressure to said inlet openings thereby to prevent reverse drainage flow of fluid from said housing via said inlet openings upon said cessation of flow.

References Cited in the file of this patent

UNITED STATES PATENTS

| | | |
|---|---|---|
| 1,076,128 | Kupferle | Oct. 21, 1913 |
| 1,191,628 | Trinks | July 18, 1916 |
| 1,913,401 | Liddell | June 13, 1933 |
| 1,950,325 | Punte | Mar. 6, 1934 |
| 2,183,616 | Korte | Dec. 19, 1939 |
| 2,188,745 | Wagner | Jan. 30, 1940 |
| 2,203,668 | Burckhalter | June 11, 1940 |
| 2,372,286 | Mieras | Mar. 27, 1945 |
| 2,382,716 | Henzmark | Aug. 14, 1945 |
| 2,480,108 | Barker | Aug. 30, 1949 |
| 2,591,248 | Francois | Apr. 1, 1952 |
| 2,743,018 | Belgarde | Apr. 24, 1956 |

FOREIGN PATENTS

| | | |
|---|---|---|
| 95,604 | Sweden | May 2, 1939 |
| 882,551 | France | Mar. 1, 1943 |
| 126,005 | Australia | Nov. 3, 1947 |
| 702,168 | Great Britain | Jan. 13, 1954 |